US012615461B2

(12) United States Patent
Wang et al.

(10) Patent No.: US 12,615,461 B2
(45) Date of Patent: Apr. 28, 2026

(54) INTEGRATED OPTICAL TRANSCEIVER APPARATUS AND OPTICAL LINE TERMINAL

(71) Applicant: HUAWEI TECHNOLOGIES CO., LTD., Shenzhen (CN)

(72) Inventors: Shaowu Wang, Dongguan (CN); Chee Wei Lee, Shenzhen (CN); Stevanus Darmawan, Chiba (JP); Yongping Liao, Dongguan (CN); Jinlin Zeng, Dongguan (CN); Qian Wang, Shenzhen (CN); Ruiqiang Ji, Shenzhen (CN); Jian Jian, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 18/359,047

(22) Filed: Jul. 26, 2023

(65) Prior Publication Data

US 2023/0370754 A1    Nov. 16, 2023

Related U.S. Application Data

(63) Continuation of application No. PCT/CN2022/074089, filed on Jan. 26, 2022.

(30) Foreign Application Priority Data

Jan. 28, 2021    (CN) .......................... 202110120984.7

(51) Int. Cl.
| | |
|---|---|
| *H04B 10/40* | (2013.01) |
| *H04J 14/02* | (2006.01) |
| *H04Q 11/00* | (2006.01) |

(52) U.S. Cl.
CPC ......... *H04Q 11/0067* (2013.01); *H04B 10/40* (2013.01); *H04J 14/0282* (2013.01); *H04J 14/0307* (2023.08)

(58) Field of Classification Search
None
See application file for complete search history.

(56) References Cited

U.S. PATENT DOCUMENTS

| | | | |
|---|---|---|---|
| 7,885,492 B2 | 2/2011 | Welch et al. | |
| 2004/0086214 A1* | 5/2004 | Huang ..................... G02F 1/093 385/11 |

(Continued)

FOREIGN PATENT DOCUMENTS

| | | |
|---|---|---|
| CN | 201051158 Y | 4/2008 |
| CN | 101533128 A | 9/2009 |

(Continued)

*Primary Examiner* — Nathan M Cors
(74) *Attorney, Agent, or Firm* — Rimon PC

(57) ABSTRACT

Embodiments of an integrated optical transceiver apparatus and an OLT are provided. A first splitter and a second splitter are integrated into a PLC structure of the apparatus. The first splitter is configured to output a signal light of a first wavelength and a signal light of a second wavelength, and output a signal light of a third wavelength and a signal light of a fourth wavelength. The second splitter is configured to separate the signal light of the third wavelength and the signal light of the fourth wavelength, and output the signal light of the third wavelength, and output the signal light of the fourth wavelength. A first optical detector and a second optical detector are disposed on the PLC structure, where the first optical detector and the second optical detector are configured to convert, into electrical signals, the signal lights output by the second splitter.

18 Claims, 7 Drawing Sheets

(56) References Cited

U.S. PATENT DOCUMENTS

| | | | |
|---|---|---|---|
| 2005/0123241 A1 | 6/2005 | Margalit et al. | |
| 2006/0263092 A1* | 11/2006 | Hosking | H04B 10/0799 |
| | | | 398/135 |
| 2007/0133923 A1* | 6/2007 | Park | G02B 6/42 |
| | | | 385/14 |
| 2008/0152345 A1* | 6/2008 | Park | H04J 14/025 |
| | | | 398/79 |
| 2011/0103415 A1* | 5/2011 | Rasras | G02B 6/4215 |
| | | | 250/214 R |
| 2013/0112858 A1* | 5/2013 | Rosiewicz | G01M 11/3181 |
| | | | 250/227.28 |
| 2016/0291254 A1 | 10/2016 | Zhang | |
| 2018/0284350 A1 | 10/2018 | Ayliffe et al. | |
| 2020/0322061 A1 | 10/2020 | Li et al. | |

FOREIGN PATENT DOCUMENTS

| | | | |
|---|---|---|---|
| CN | 201654271 U | 11/2010 |
| CN | 202159164 U | 3/2012 |
| CN | 103701532 A | 4/2014 |
| CN | 104467974 A | 3/2015 |
| CN | 106160871 A | 11/2016 |
| JP | 2006106406 A | 4/2006 |
| JP | 2006251152 A | 9/2006 |
| JP | 2015172540 A | 10/2015 |
| JP | 2017194565 A | 10/2017 |
| JP | 2018066962 A | 4/2018 |
| JP | 2018511955 A | 4/2018 |
| KR | 20070016690 A | 2/2007 |
| KR | 20090119185 A | 11/2009 |
| WO | 9836299 A1 | 8/1998 |
| WO | 03027736 A1 | 4/2003 |
| WO | 2005106550 A1 | 11/2005 |

* cited by examiner

121

121b

121a

121e

121d

121c

122

INTEGRATED OPTICAL TRANSCEIVER APPARATUS AND OPTICAL LINE TERMINAL

CROSS-REFERENCE TO RELATED APPLICATIONS

This application is a continuation of International Application No. PCT/CN2022/074089, filed on Jan. 26, 2022, which claims priority to Chinese Patent Application No. 202110120984.7, filed on Jan. 28, 2021. The disclosures of the aforementioned applications are hereby incorporated by reference in their entireties.

TECHNICAL FIELD

This disclosure generally relates to the field of optical communications technologies, and in particular, to an integrated optical transceiver apparatus and an optical line terminal.

BACKGROUND

An optical transceiver apparatus is an important component in an optical communications system, and is used for a sending and receiving of signal light. To simplify a packaging process of the optical transceiver apparatus, a plurality of devices may be integrated together in the optical transceiver apparatus.

In a related technology, the integrated optical transceiver apparatus includes an optical device and an electrical device. The optical device includes a bidirectional splitter, and the electrical device includes an optical detector. The bidirectional splitter is used to output a signal light of a first wavelength from a laser to an optical fiber so that it may implement the sending of the signal light. The bidirectional splitter may also output a signal light of a second wavelength from the optical fiber to the optical detector, so that the optical detector converts the received signal light into an electrical signal, so that it may implement the receiving of the signal light. The bidirectional splitter is integrated into a planar lightwave circuit (PLC) structure, and the optical detector is fixed on the PLC structure.

The signal light sent by the optical transceiver apparatus and the signal light received by the optical transceiver each define a single wavelength, which does meet development requirements for an optical communications network.

SUMMARY

Embodiments of this disclosure provide for an integrated optical transceiver apparatus and an optical line terminal, so as to implement a sending of a dual-wavelength signal light and a receiving of a dual-wavelength signal light. The technical solutions are as follows.

According to one aspect, an integrated optical transceiver apparatus is provided. The integrated optical transceiver apparatus includes a planar waveguide circuit (PLC) structure (e.g., a PLC system) and an electrical device. An optical device is integrated into the PLC structure, and the optical device includes a first splitter and a second splitter. An electrical device is disposed on the PLC structure, and the electrical device includes a first optical detector and a second optical detector.

The first splitter has a first end, a second end, and a third end. The first splitter is configured to output, from the second end of the first splitter to an optical fiber, a signal light of a first wavelength and a signal light of a second wavelength that are received by the first end of the first splitter, so as to implement a sending of the signal light of the first wavelength and the signal light of the second wavelength.

The first splitter is further configured to output, from the third end of the first splitter, a signal light of a third wavelength and a signal light of a fourth wavelength that are received by the second end of the first splitter from the optical fiber. The second splitter has a first end, a second end, and a third end. The first end of the second splitter is connected to the third end of the first splitter. The second splitter is configured to separate the signal light of the third wavelength and the signal light of the fourth wavelength that are output from the third end of the first splitter, output the signal light of the third wavelength from the second end of the second splitter, and output the signal light of the fourth wavelength from the third end of the second splitter. The first optical detector is configured to convert, into an electrical signal, the signal light of the third wavelength that is output by the second end of the second splitter, and the second optical detector is configured to convert, into an electrical signal, the signal light of the fourth wavelength that is output by the third end of the second splitter. This arrangement facilitates for the receiving of the signal light of the third wavelength and the signal light of the fourth wavelength.

It can be learned that the signal light sent by the integrated optical transceiver apparatus provided in some embodiments is a dual-wavelength signal light, and the received signal light is also a dual-wavelength signal light. The signal light of different wavelengths allow for more information to be carried, thereby improving a capacity of an optical communications system. This is also advantageous as it allows for the integrated optical transceiver apparatus to adapt to development requirements for an optical communications network. In addition, in some embodiments, during assembly of the optical transceiver apparatus, the electrical device only needs to be attached to the PLC structure as the optical device is integrated into the PLC structure, thereby simplifying an assembly process. In addition, the optical device and the electrical device that implement bidirectional transmission of dual-wavelength signal light are integrated into one PLC structure, so that a size of the optical transceiver apparatus is relatively small.

In some embodiments, the integrated optical transceiver apparatus is also referred to as a PLC chip. The first splitter has a bidirectional demultiplexing function, and may also be referred to as a bidirectional (BiDi) splitter. The second splitter may also be referred to as a wavelength division multiplexer (WDM).

Optionally, the first splitter is a directional coupler (DC), a Mach-Zehnder interferometer (MZI), or an arrayed waveguide grating (AWG). Bidirectional demultiplexing of dual wavelengths may be implemented by using a single optical device, which results in a simple structure having a high integration.

Optionally, the second splitter is an MZI or an AWG.

Optionally, the optical device further includes a spotsize converter (SSC). The SSC is connected to the second end of the first splitter, and is configured to couple the signal light of the first wavelength and the signal light of the second wavelength that are output by the second end of the first splitter to the optical fiber. The SSC is further configured to couple the signal light of the third wavelength and the signal light of the fourth wavelength that are output by the optical fiber to the second end of the first splitter. This coupling arrangement between the integrated optical transceiver apparatus and the optical fiber improves an efficiency of the optical device by using the SSC.

In a possible embodiment, the SSC is a grating waveguide SSC. The grating waveguide SSC includes a tapered waveguide and a grating array. The tapered waveguide and the grating array are sequentially arranged in a direction away from the second end of the first splitter. The tapered waveguide is configured to perform a spotsize conversion in a first direction. The grating array is configured to perform a spotsize conversion in a second direction. This allows for coupling the signal light of the first wavelength and the second wavelength and that is output by the second end of the first splitter to the optical fiber. This arrangement also allows for coupling the signal light of the third wavelength and the fourth wavelength that are output by the optical fiber to the second end of the first splitter. In some embodiments, the first direction is perpendicular to the second direction. The grating waveguide SSC can convert spot sizes simultaneously in the first direction and the second direction that are perpendicular to each other. Because the optical fiber is of a three-dimensional structure, a spot size and a shape obtained through the conversion of the spot sizes simultaneously in the first direction and the second direction, that are perpendicular to each other, better match a cross section of the optical fiber. This further improves a coupling efficiency between the integrated optical transceiver apparatus and the optical fiber.

In another possible embodiment, the SSC is a waveguide SSC, and the waveguide SSC is a tapered waveguide. A small end of the tapered waveguide is an input end, the input end is connected to an optical fiber in the PLC structure, a large end of the tapered waveguide is an output end, and the output end is coupled to an end surface of the optical fiber, so as to couple the signal light of the first wavelength and the second wavelength that are output by the second end of the first splitter to the optical fiber. This arrangement also allows for coupling the signal light of the third wavelength and the fourth wavelength that are output by the optical fiber to the second end of the first splitter. The SSC formed by the tapered waveguide defines a simple structure and simplifies the manufacturing process.

The PLC structure has a top surface, a bottom surface, and a side surface, where the top surface is opposite (e.g., diametrically opposed) to the bottom surface, the side surface is connected (e.g., coupled) to the top surface and the bottom surface, and the side surface surrounds the top surface.

In a possible embodiment, the first optical detector and the second optical detector are located on the top surface, the end surface of the optical fiber is opposite to the side surface, and the PLC structure further has a first reflective surface and a second reflective surface. The first reflective surface is configured to reflect, to the first optical detector, the signal light of the third wavelength that is output by the second end of the second splitter. The second reflective surface is configured to reflect, to the second optical detector, the signal light of the fourth wavelength that is output by the third end of the second splitter. The PLC structure utilizes a silicon dioxide platform which facilitates coupling to an optical fiber and has low costs. In addition, the PLC structure is insensitive to polarization, thereby improving light transmission efficiency. In addition, the electrical device is disposed on the top surface of the PLC structure, and the electrical device only needs to be attached to the top surface. This arrangement is easy to implement, and further reduces a size of the integrated optical transceiver apparatus in a direction parallel to the top surface of the PLC structure.

In another possible embodiment, the first optical detector and the second optical detector are located on the side surface, and the end surface of the optical fiber is opposite to the side surface. The electrical device is disposed on the side surface of the PLC structure, thereby reducing a height of the integrated optical transceiver apparatus in a direction perpendicular to the top surface of the PLC structure.

In a possible embodiment, the PLC structure is a PLC structure based on a silicon dioxide platform with a low refractive index difference. The PLC structure based on the silicon dioxide platform with the low refractive index difference includes a first silicon dioxide layer, a second silicon dioxide layer, and a third silicon dioxide layer that are sequentially stacked. A refractive index of the second silicon dioxide layer is greater than a refractive index of the first silicon dioxide layer, the refractive index of the second silicon dioxide layer is greater than a refractive index of the third silicon dioxide layer, and the optical device is integrated into the second silicon dioxide layer.

In another possible embodiment, the PLC structure is based on a silicon-on-insulator (SOI) platform. For example, the PLC structure based on the SOI platform includes a silicon substrate, a semiconductor insulation layer, and a silicon layer, and the insulation layer and the silicon layer are sequentially stacked on the silicon substrate. The optical device is integrated into the silicon layer. For example, the insulation layer of the semiconductor is a silicon dioxide layer.

Optionally, the electrical component further includes two transimpedance amplifiers (TIA). One of the two TIAs is connected to the first optical detector, and the other of the two TIAs is connected to the second optical detector. The TIAs are configured to perform low-noise amplification of a received electrical signal with a specific strength, so as to increase a ratio of an optical signal to noise.

Optionally, both the first optical detector and the second optical detector are avalanche photodiodes (APD) or positive-intrinsic-negative (PIN) photodiodes (PD).

In some examples, the integrated optical transceiver apparatus further includes a light source, and the light source is configured to provide the signal light of the first wavelength and the signal light of the second wavelength. The light source is also integrated into the PLC structure. For example, an output end of the light source is attached to a side surface of the PLC structure, to further improve an integration degree of the optical transceiver apparatus.

Optionally, the light source includes a first laser, a second laser, and an optical multiplexer. The first laser is configured to transmit the signal light of the first wavelength, the second laser is configured to transmit the signal light of the second wavelength, and the optical multiplexer is configured to combine the signal light of the first wavelength and the signal light of the second wavelength into one signal and output the signal to the first end of the first splitter. During an implementation, all of the components in the light source are first assembled together, and then are attached to the PLC structure, so that the light source and the PLC structure are integrated together.

Optionally, the first wavelength belongs to a long-wavelength band, the second wavelength belongs to a short-wavelength band, and the third wavelength and the fourth wavelength belong to an original band.

In another aspect, an optical line terminal (OLT) is provided, where the OLT includes a plurality of optical modules, and any optical module of the plurality of optical modules includes any one of the integrated optical transceiver apparatuses described above.

REFERENCE NUMERALS

1: light source; 2: optical fiber;

10: Planar lightwave circuit (PLC) structure; 10a: top surface; 10b: bottom surface; 10c: side surface;

101: first silicon dioxide layer; 102: second silicon dioxide layer; 103: third silicon dioxide layer;

11: first splitter; 11a: first end of the first splitter; 11b: second end of the first splitter; 11c: third end of the first splitter; and 11d: fourth end of the first splitter;

111. DC; 112. MZI; 113. AWG;

12: second splitter; 12a: first end of the second splitter; 12b: second end of the second splitter; 12c: third end of the second splitter;

121: AWG; 122: MZI;

13: SSC; 131: tapered waveguide; 132: grating array; 132a: strip structure; 133b: filling structure;

141: first waveguide; 142: second waveguide; 143: third waveguide; 144: fourth waveguide; 145: fifth waveguide;

144a: first reflective surface; 145a: second reflective surface;

21a: first optical detector; 21b: second optical detector; and

22: Transimpedance amplifier (TIA).

DESCRIPTION OF EMBODIMENTS

Figure 1:
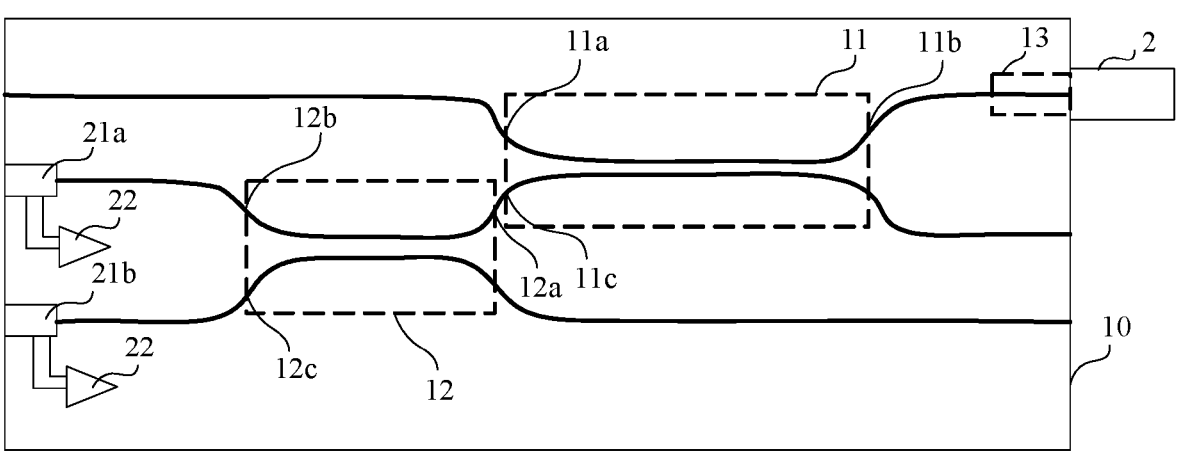
FIG. 1 is a schematic diagram of a structure of an integrated optical transceiver, apparatus according to an embodiment of this disclosure.

FIG. 1 is a schematic diagram of a structure (e.g., system) of an integrated optical transceiver apparatus according to an embodiment of this disclosure. As shown in FIG. 1, the integrated optical transceiver apparatus includes a planar lightwave circuit (PLC) structure 10 (e.g., PLC system) and an electrical device.

An optical device is integrated into the PLC structure 10, and the optical device includes a first splitter 11 and a second splitter 12. The first splitter 11 has a first end 11a, a second end 11b, and a third end 11c. The first splitter 11 is configured to output, from the second end 11b of the first splitter 11 to an optical fiber 2, a signal light of a first wavelength and a second wavelength that are received by the first end 11a of the first splitter 11, and output, from the third end 11c of the first splitter 11, a signal light of a third wavelength and a signal light of a fourth wavelength that are received by the second end 11b of the first splitter 11 from the optical fiber 2. The second splitter 12 has a first end 12a, a second end 12b, and a third end 12c. The first end 12a of the second splitter 12 is connected to the third end 11c of the first splitter 11. The second splitter 12 is configured to separate the signal light of the third wavelength and the signal light of the fourth wavelength that are output from the third end 11c of the first splitter 11, output the signal light of the third wavelength from the second end 12b of the second splitter 12, and output the signal light of the fourth wavelength from the third end 12c of the second splitter 12.

The electrical device is located on the PLC structure 10, and the electrical device includes a first optical detector 21a and a second optical detector 21b. The first optical detector 21a is configured to convert, into an electrical signal, the signal light of the third wavelength that is output by the second end 12b of the second splitter 12. The second optical detector 21b is configured to convert, into an electrical signal, the signal light of the fourth wavelength that is output by the third end 12c of the second splitter 12.

Optionally, the first splitter 11 is a directional coupler (DC), a Mach-Zehnder interferometer (MZI), or an arrayed waveguide grating (AWG). Optionally, the second splitter 12 is an MZI or an AWG. Optionally, both the first optical detector 21a and the second optical detector 21b are avalanche photodiodes (APDs) or positive-intrinsic-negative (PIN)-type photodiodes (PDs).

Optionally, the optical device further includes a spotsize converter (SSC) 13. The SSC 13 is connected to the second end 11b of the first splitter 11. The SSC 13 is configured to couple the signal light of the first wavelength and the signal light of the second wavelength that are output by the second end 11b of the first splitter 11 to the optical fiber 2. The SSC 13 is further configured to couple the signal light of the third wavelength and the signal light of the fourth wavelength that are output by the optical fiber 2 to the second end 11b of the first splitter 11. Optionally, the SSC 13 is any one of the following: a grating waveguide SSC or a waveguide SSC.

In a possible embodiment, the PLC structure 10 is based on a silicon dioxide platform. The PLC structure based on the silicon dioxide platform includes a first silicon dioxide layer, a second silicon dioxide layer, and a third silicon dioxide layer that are sequentially stacked. A refractive index of the second silicon dioxide layer is greater than a refractive index of the first silicon dioxide layer, and the refractive index of the second silicon dioxide layer is greater than a refractive index of the third silicon dioxide layer. The optical device is integrated into the second silicon dioxide layer. The PLC structure using a silicon dioxide platform facilitates for the coupling to an optical fiber and has low costs. In addition, the PLC structure is insensitive to polarization, thereby improving light transmission efficiency.

For example, in the PLC structure based on the silicon dioxide platform, the second silicon dioxide layer is used as a core layer, the first silicon dioxide layer and the third silicon dioxide layer are used as cladding layers, and a refractive index difference between the core layer and a cladding layer is set according to a requirement, for example, to be within 3%. This requirement means that a ratio of the refractive index difference between the core layer and the cladding layer to the refractive index of the cladding layer is less than 3%.

In another possible embodiment, the PLC structure 10 is based on a silicon-on-insulator (SOI) platform. For example, the PLC structure based on the SOI platform includes a silicon substrate, an insulation layer, and a silicon layer, and the insulation layer and the silicon layer are sequentially stacked on the silicon substrate. The optical device is integrated into the silicon layer. For example, the insulation layer is a silicon dioxide layer.

It should be noted that a material used for the PLC structure is not limited in this disclosure. In addition to the silicon dioxide platform and the SOI platform, another platform may be used for some embodiments.

Optionally, the electrical device further includes two transimpedance amplifiers (TIAs) 22. One of the two TIAs 22 is connected to the first optical detector 21$a$, and the other of the two TIAs 22 is connected to the second optical detector 21$b$. The TIA 22 is configured to perform low-noise amplification with an intensity on an electrical signal that is output by a corresponding optical detector, so as to improve a ratio of an optical signal-to-noise.

It should be noted that in some embodiments, any combination of a type of the first splitter, a type of the second splitter, and a type of the SSC falls within the protection scope of this disclosure. This is not limited in this disclosure.

Figure 2:
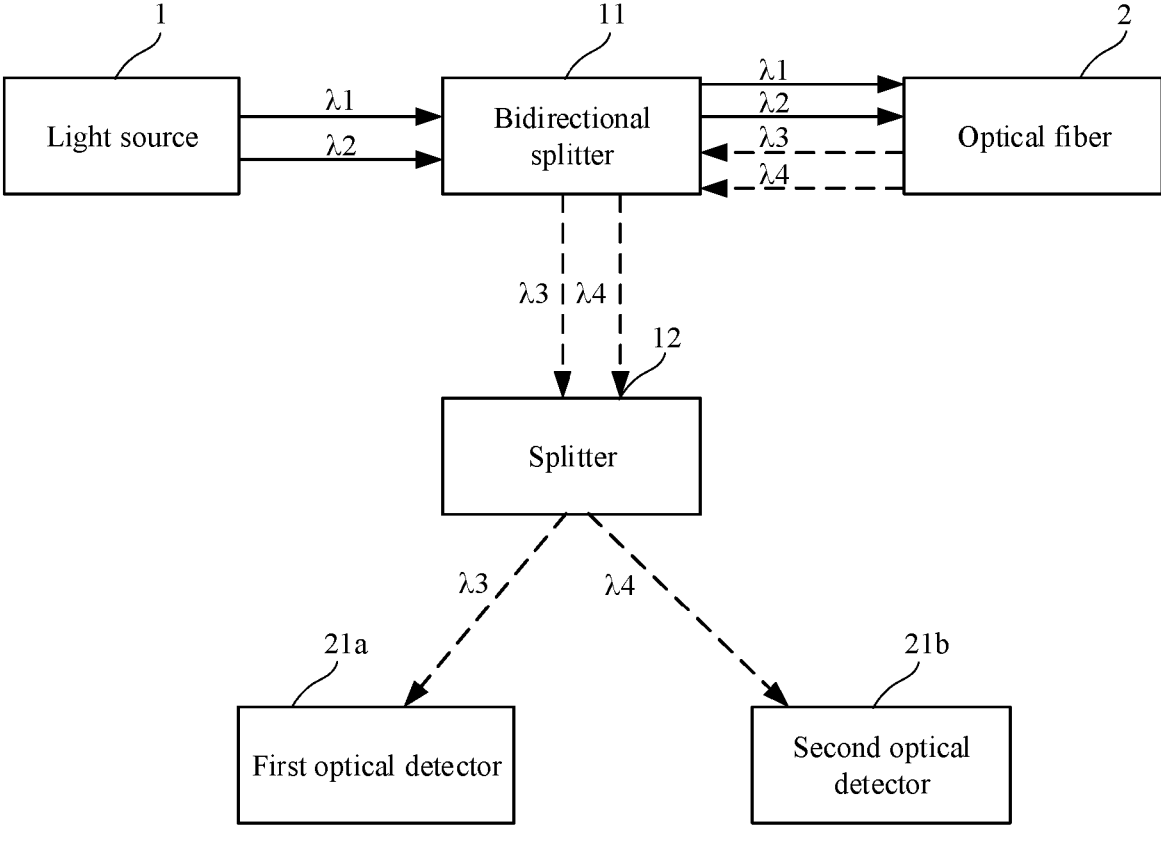
FIG. 2 is a principle diagram of the integrated optical transceiver apparatus shown in FIG. 1.

FIG. 2 is a schematic diagram of a working principle of the integrated optical transceiver apparatus shown in FIG. 1. As shown in FIG. 2, a signal light of a first wavelength λ1 and a second wavelength λ2 that are emitted by a light source 1 are transmitted to the first splitter 11, and are output to the optical fiber 2 by using the first splitter 11. The optical fiber 2 outputs a signal light of a third wavelength λ3 and a signal light of a fourth wavelength λ4 to the first splitter 11. The first splitter 11 outputs the signal light of the third wavelength λ3 and the signal light of the fourth wavelength λ4 to the second splitter 12. The second splitter 12 separates the signal light of the third wavelength λ3 from the signal light of the fourth wavelength λ4, and outputs the signal light of the third wavelength λ3 to the first optical detector 21$a$ and the signal light of the fourth wavelength λ4 to the second optical detector 21$b$.

Optionally, the first wavelength λ1 belongs to (e.g., is within) a long wavelength (L) band, the second wavelength λ2 belongs to (e.g., is within) a short wavelength (S) band, and the third wavelength λ3 and the fourth wavelength belong to (e.g., are within) an original (O) band. In the field of optical communications, the L band is from 1565 nm to 1625 nm, the S band is from 1460 nm to 1530 nm, and the O band is from 1260 nm to 1360 nm. Therefore, in some embodiments, multi-band signal light transmission can be implemented.

For example, the first wavelength λ1 is 1577 nm, second wavelength λ2 is 1490 nm, the third wavelength λ3 is 1270 nm, and the fourth wavelength λ4 is 1310 nm. The first wavelength λ1 and the third wavelength λ3 are service wavelengths of a 10-gigabit-capable passive optical network (XGPON) system, and the second wavelength λ2 and the fourth wavelength λ4 are service wavelengths of a gigabit-capable passive optical network (GPON) system. Therefore, the integrated optical transceiver apparatus can meet development requirements for an optical communications network.

Figure 3:
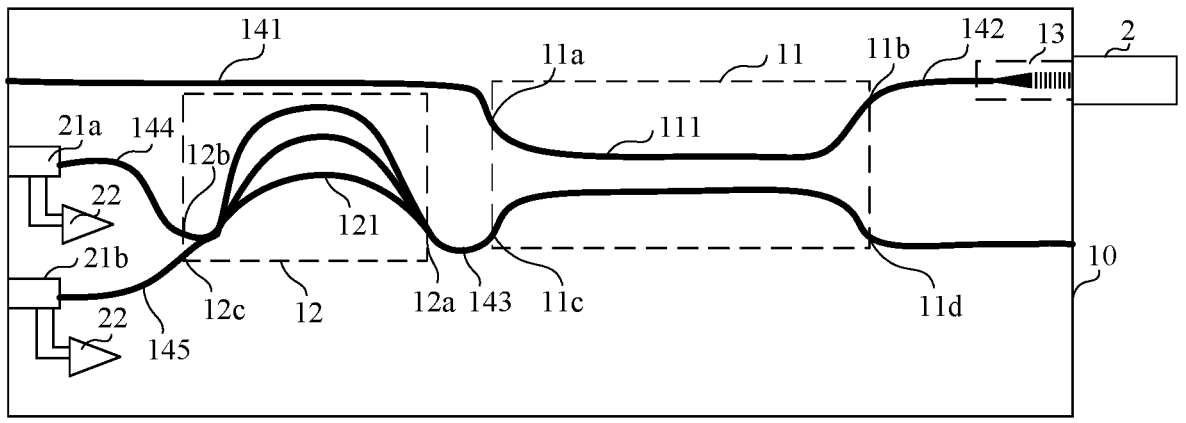
FIG. 3 is a schematic diagram of a structure of another integrated optical transceiver apparatus, according to an embodiment of this disclosure.

FIG. 3 is a schematic diagram of a top view of a structure (e.g., system) of another integrated optical transceiver apparatus according to an embodiment of this disclosure. As shown in FIG. 3, the integrated optical transceiver apparatus includes a PLC structure 10, and an optical device is integrated into the PLC structure 10. The optical device includes a first splitter 11 and a second splitter 12.

The first splitter 11 is a DC 111, and the DC 111 is a four-port device. Therefore, the first splitter 11 has a first end 11$a$, a second end 11$b$, a third end 11$c$, and a fourth end 11$d$.

The first end 11$a$ of the first splitter 11 is connected to one end of a first waveguide 141, and the other end of the first waveguide 141 extends to a side surface of the PLC structure 10, to be coupled to a light source. The first waveguide 141 can transfer a signal light of a first wavelength and a signal light of a second wavelength that are from the light source to the first end 11$a$ of the first splitter 11.

The second end 11$b$ of the first splitter 11 is connected to one end of a second waveguide 142, and the other end of the second waveguide 142 is coupled to an optical fiber 2. The second waveguide 142 can transfer a signal light of a third wavelength and a signal light of a fourth wavelength that are from an optical fiber 3 to the second end 11$b$ of the first splitter 11.

The third end 11$c$ of the first splitter 11 is connected to one end of a third waveguide 143, and the other end of the third waveguide 143 is connected to a first end 12$a$ of the second splitter 12. The third waveguide 143 can transfer the optical signal that is output by the third end 11$c$ of the first splitter 11 to the first end 12$a$ of the second splitter 12.

The fourth end 11$d$ of the first splitter 11 is vacant, and is not connected to another optical device.

Figure 4:
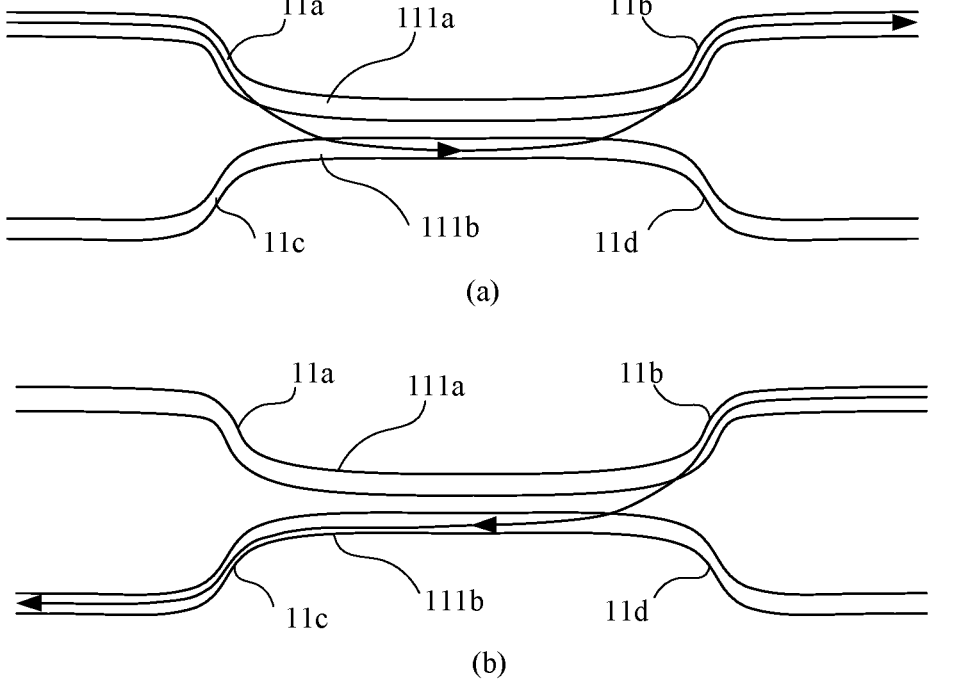
FIG. 4 is a schematic diagram of a working principle of a directional coupler (DC)

FIG. 4 is a schematic diagram of a structure of a DC. With reference to FIG. 4, the DC 111 includes two branches: a first branch 111$a$ and a second branch 111$b$. Two ends of the first branch 111$a$ are a first end 11$a$ and a second end 11$b$ of a first splitter 11, and two ends of the second branch 111$b$ are a third end 11$c$ and a fourth end 11$d$ of the first splitter 11. The middle of the first branch 111$a$ and the middle of the second branch 111$b$ are coupled to each other.

As shown in part (a) of FIG. 4, a signal light of a first wavelength and a signal light of a second wavelength enter the first branch 111$a$ from the first end 11$a$ of the first splitter 11, are coupled from the middle of the first branch 111$a$ to the second branch 111$b$, are transmitted along the middle of the second branch 111$b$, are coupled from the second branch 111$b$ to the first branch 111$a$, continue to be transmitted along the first branch 111$a$, and are output from the second end 11$b$ of the first splitter 11.

As shown in part (b) of FIG. 4, a signal light of a third wavelength and a signal light of a fourth wavelength enter the first branch 111$a$ from the second end 11$b$ of the first splitter 11, are coupled from the middle of the first branch 111$a$ to the second branch 111$b$, are then transmitted along the second branch 111$b$, and are output from the third end 11$c$ of the first splitter 11.

It should be noted that the coupling process of the signal light shown in FIG. 4 is merely an example. In some embodiments, the signal light may be coupled between the first branch 111a and the second branch 111b for a plurality of times. A quantity of coupling times is not limited in some embodiments, provided that it can be ensured that the signal light of the first wavelength and the signal light of the second wavelength enter the first branch 111a from the first end 11a of the first splitter 11 and are output from the second end 11b of the first splitter 11, and provided that it can be ensured that the signal light of the third wavelength and the signal light of the fourth wavelength enter the first branch 111a from the second end 11b of the first splitter 11, and are output from the third end 11c of the first splitter 11.

During some implementations, parameters such as lengths and a spacing of branches of the DC 111 are designed, so that signal light that is in a first band and that is input from the first end 11a of the first splitter 11 to the DC 111 can be coupled from the first branch 111a to the second branch 111b, coupled from the second branch 111b to the first branch 111a, and output from the second end 11b of the first splitter 11. In addition, a signal light that is in the second band and that is input from the second end 11b of the first splitter 11 to the DC 111 can be coupled from the first branch 111a to the second branch 111b and output from the third end 11c of the first splitter 11. In this way, both the signal light of the first wavelength and the signal light of the second wavelength that are in the first band can be input from the first end 11a of the first splitter 11 and output from the second end 11b of the first splitter 11, and both the signal light of the third wavelength and the signal light of the fourth wavelength that are in the second band can be input from the second end 11b of the first splitter 11 and output from the third end 11c of the first splitter 11. Therefore, a bidirectional demultiplexing function is implemented by using the DC 111.

Herein, both the first band and the second band belong to continuous wavelength ranges, the first band includes an L band and an S band, the second band is an O band, and there is no intersection between a first bandwidth and a second bandwidth.

For example, in the embodiment shown in FIG. 3, the second splitter 12 is an AWG 121. When the third wavelength and the fourth wavelength belong to the O band, a length of each waveguide and a spacing between waveguides in arrayed waveguides of the AWG are designed, so that the AWG 121 can implement low-crosstalk demultiplexing on the signal light of the third wavelength and the signal light of the fourth wavelength.

Figure 5:
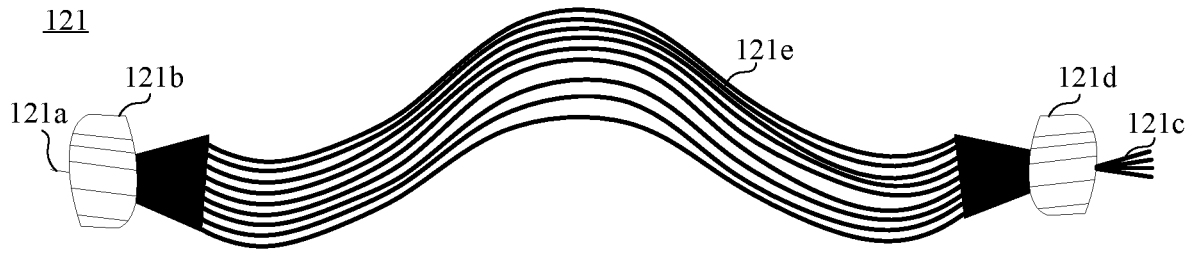
FIG. 5 is a schematic diagram of a structure of an arrayed waveguide grating (AWG)

FIG. 5 is a schematic diagram of a structure of an AWG. As shown in FIG. 5, the AWG 121 includes at least one input waveguide 121a, a first planar waveguide 121b, a plurality of output waveguides 121c, a second planar waveguide 121d, and an arrayed waveguide 121e. The plurality of input waveguides 121a are connected to the first planar waveguide 121b, the plurality of output waveguides 121c are connected to the second planar waveguide 121d, and the arrayed waveguide 121e is connected between the first planar waveguide 121b and the second planar waveguide 121d. The arrayed waveguide 121e is a group of waveguides having an equal length difference, and there is an equal length difference between any two adjacent waveguides in the arrayed waveguide 121e.

It should be noted that the black block-shaped areas in FIG. 5 are formed due to an excessive density of the arrayed waveguide 121e, and do not represent another structure (e.g., system).

After a signal light including a plurality of wavelengths is input from any input waveguide 121a to the first planar waveguide 121b, the first planar waveguide 121b allocates, based on a basically average optical power, the signal light including the plurality of wavelengths to each waveguide in the arrayed waveguide 121e. Because lengths of a plurality of waveguides in the arrayed waveguide 121e are different, phase delays generated when signal light of different wavelengths arrives at the second planar waveguide 121d through the arrayed waveguide 121e are also different, and the signal light of the different wavelengths is converged in the second planar waveguide 121d. Based on the optical interference principle, the signal light of the different wavelengths is focused at different positions. Ports of the plurality of output waveguides 121c are located at focus positions corresponding to the signal light of the different wavelengths, so that the plurality of output waveguides 121c can output the signal light of corresponding wavelengths, and different output waveguides 121c correspond to signal light of different wavelengths. Through this process, the AWG 121 can implement a function of demultiplexing signal light of different wavelengths.

In some embodiments, the first end 12a of the second splitter 12 is one of the plurality of input waveguides 121a, and the second end 12b and the third end 12c of the second splitter 12 are both output waveguides 121c. The first end 12a of the second splitter 12 is connected to the third end 11c of the first splitter 11 by using the third waveguide 143. Therefore, the first end 12a of the second splitter 12 receives the signal light of the third wavelength and the signal light of the fourth wavelength that are output from the third end 11c of the first splitter 11. After separating the signal light of the third wavelength and the signal light of the fourth wavelength, the second splitter 12 outputs the signal light of the third wavelength from the second end 12b of the second splitter 12, and outputs the signal light of the fourth wavelength from the third end 12c of the second splitter 12.

As shown in FIG. 3, the integrated transceiver further includes an electrical device. The electrical device includes the first optical detector 21a and the second optical detector 21b. The second end 12b of the second splitter 12 is connected to one end of a fourth waveguide 144, the other end of the fourth waveguide 144 is coupled to the first optical detector 21a, and the fourth waveguide 144 can couple the signal light of the third wavelength to the first optical detector 21a. The third end 12c of the second splitter 12 is connected to one end of a fifth waveguide 145, the other end of the fifth waveguide 145 is coupled to the second optical detector 21b, and the fifth waveguide 145 can couple the signal light of the fourth wavelength to the second optical detector 21b.

Refer to FIG. 3 again. The optical device 10 further includes an SSC 13. The other end of the second waveguide 142 is connected to the SSC 13, and is coupled to the optical fiber 2 by using the SSC 13. Efficient coupling between the second waveguide 142 and the optical fiber 2 can be implemented by using the SSC 13. As shown in FIG. 3, the SSC 13 is a grating waveguide SSC.

Figure 6:
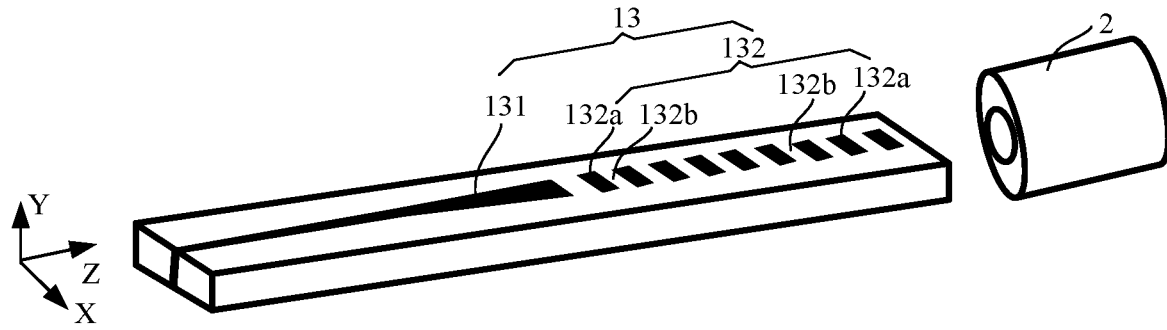
FIG. 6 is a schematic diagram of an enlarged structure of a grating waveguide spotsize converter (SSC)

FIG. 6 is a schematic diagram of an enlarged structure of a grating waveguide SSC. As shown in FIG. 6, the grating waveguide SSC includes a tapered waveguide 131 and a grating array 132. The tapered waveguide 131 is configured to perform a spotsize conversion in a first direction X, the grating array 132 is configured to perform a spotsize conversion in a second direction Y, and the first direction X is perpendicular to the second direction Y In some embodiments, the first direction X is parallel to a propagation plane of signal light, and the second direction Y is perpendicular to the propagation plane of the signal light. The propagation plane of the signal light is a plane on which the foregoing waveguides (for example, the first waveguide 141 to the fourth waveguide 144) and the SSC 13 are located.

The tapered waveguide 131 includes a small end and a large end. The small end is connected to the second waveguide 142, and the large end is disposed closer to the optical fiber 2 than the small end. A size of the tapered waveguide changes, so that a spotsize size gradually increases from the small end to the large end along an extension direction of the tapered waveguide, thereby implementing the spotsize conversion in the first direction X.

The grating array 132 is located between the large end and the optical fiber 2, and includes a plurality of strip structures 132a disposed in parallel and filling structures 132b filled between the strip structures 132a. The strip structures 132a and the second waveguide 142 are on a same layer and are formed by using a same material. A refractive index of the filling structure 132b is different from a refractive index of the strip structures 132a. For example, a length of each strip structure 132a is equal to a length of a side edge of the large end of the tapered waveguide 131. The signal light is transferred to the grating array 132, and when the signal light is propagated along the grating array 132, a binding capability of the grating array 132 to the signal light gradually decreases, so that a spotsize size increases in the second direction Y, thereby implementing the spotsize conversion in the second direction Y.

A size and a shape of the spotsize obtained through the conversion of the spotsize size in both the first direction X and the second direction Y that are perpendicular to each other better match a cross section of an optical fiber, thereby further improving a coupling efficiency between the second waveguide and the optical fiber.

Figure 7:
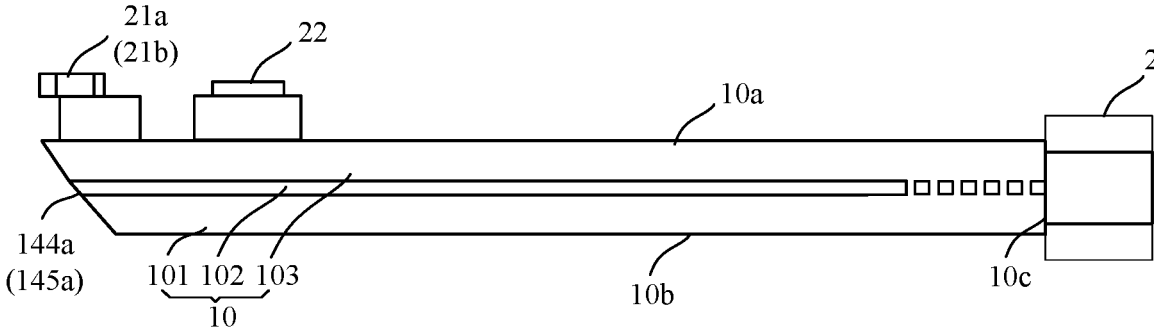
FIG. 7 is a schematic diagram of a side view of a structure of the integrated optical transceiver apparatus shown in FIG. 3.

FIG. 7 is a schematic diagram of a side view of a structure of the integrated optical transceiver apparatus shown in FIG. 3. Optionally, as shown in FIG. 7, a PLC structure 10 includes a first silicon dioxide layer 101, a second silicon dioxide layer 102, and a third silicon dioxide layer 103 that are sequentially stacked. A refractive index of the second silicon dioxide layer 102 is greater than a refractive index of the first silicon dioxide layer 101, the refractive index of the second silicon dioxide layer 102 is greater than a refractive index of the third silicon dioxide layer 103, and the optical device 10 is integrated into the second silicon dioxide layer 102.

The PLC structure 10 has a top surface 10a, a bottom surface 10b, and a side surface 10c. The top surface 10a is opposite to (e.g., diametrically opposed to) the bottom surface 10b, the side surface 10c is connected (e.g., coupled and disposed) between the top surface 10a and the bottom surface 10b, and the side surface 10c surrounds the top surface 10a. The optical device 20 is located on the top surface 10a of the PLC structure 10. An electrical device is disposed on the top surface of the PLC structure, and the electrical device only needs to be attached to the top surface. This arrangement simplifies implementation, and further reduces a size of the integrated optical transceiver apparatus in a direction parallel to the top surface of the PLC structure. The top surface is an outer surface of the first silicon dioxide layer or the third silicon dioxide layer in each stacking direction of the PLC structure.

As shown in FIG. 7, an end surface of the optical fiber 2 is located on the side surface 10c. The first optical detector 21a and the second optical detector are located on the top surface 10a. For example, the first optical detector 21a and the second optical detector are mounted on the top surface 10a of the PLC structure 10 in an inverted manner. The PLC structure 10 further has a first reflective surface 144a and a second reflective surface 145a. The first reflective surface 144a is configured to reflect, to the first optical detector 21a, the signal light of the third wavelength that is output by the second end 12b of the second splitter 12, and the second reflective surface 145a is configured to reflect, to the second optical detector 21b, the signal light of the fourth wavelength that is output by the third end 12c of the second splitter 12.

In some embodiments, the first reflective surface 144a is an end surface that is of the fourth waveguide 144 and that is positioned away from the second splitter 12, and the second reflective surface 145a is an end surface that is of the fifth waveguide 145 and that is positioned away from the second splitter 12.

For example, an included angle between the top surface 10a and the first reflective surface 144a and the included angle between the top surface 10a and the second reflective surface 145a may meet the following relationship:

$$90°-\theta_1 \geq \theta_0$$

$\theta_1$ is an included angle, and $\theta_0$ is a total reflection angle. For example, the included angle is equal to or between 38 to 42 degrees.

In this embodiment, a propagation direction of the signal light of the third wavelength in the fourth waveguide 144 is parallel to the top surface 10a of the PLC structure 10. Therefore, an incident angle of the signal light of the third wavelength on the first reflective surface 144a is equal to the difference between 90 and 01. When the incident angle is greater than or equal to the total reflection angle, the signal light of the third wavelength is completely reflected on the first reflective surface 144a.

In this embodiment, a part of a side edge that is of the bottom surface 10b and that is connected to the side surface 10c of the PLC structure 10 is cut off, and end surfaces of the fourth waveguide 144 and the fifth waveguide 145 are polished surfaces, so that end surfaces of one end of the fourth waveguide 144 and the fifth waveguide 145 and that are away from the second splitter 12 are oblique. In this arrangement, an included angle between the end surfaces and the top surface 10a is less than the total reflection angle. In this way, the first reflective surface 144a and the second reflective surface 145a can be obtained, and there is not a need to add another reflection structure to the PLC structure 10, thereby simplifying the PLC structure 10.

Figure 8:
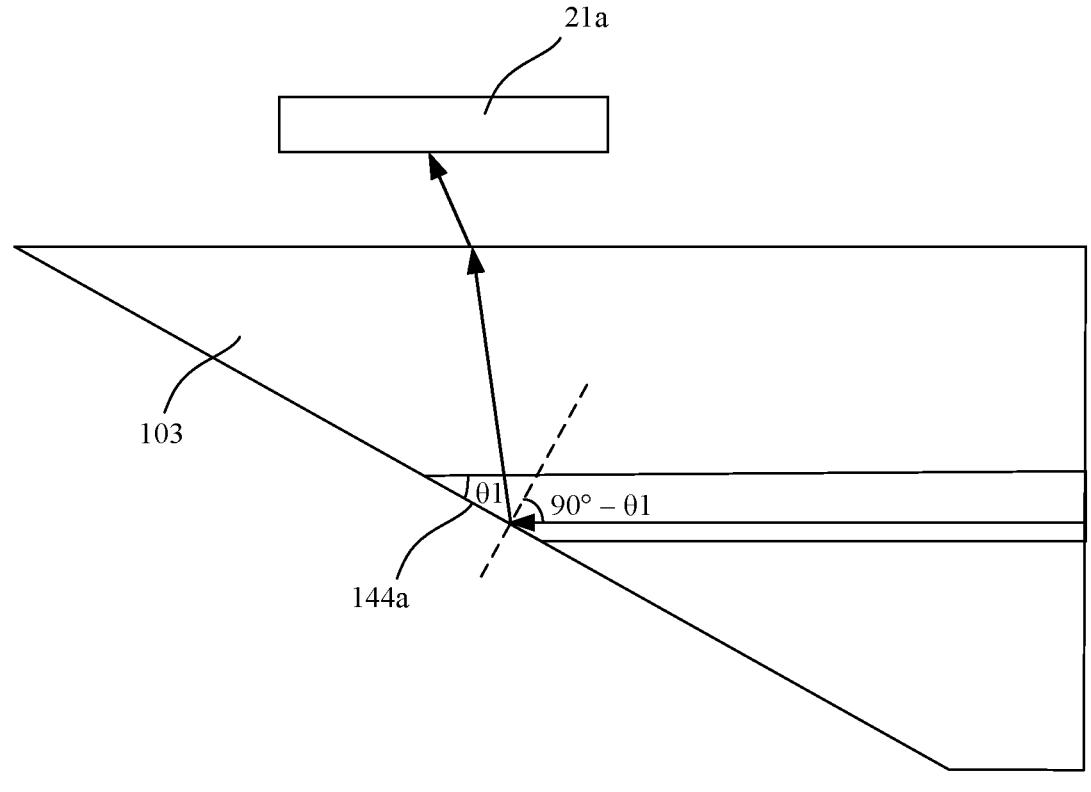
FIG. 8 is a schematic diagram of an optical path obtained after signal light of a third wavelength is reflected by a first reflective surface.

FIG. 8 is a schematic diagram of an optical path obtained after signal light of a third wavelength is reflected by a first reflective surface. As shown in FIG. 8, after the signal light of the third wavelength is reflected by a first reflective surface 144a, the signal light passes through a third silicon dioxide layer 103, and is coupled to a window of a first optical detector 21a.

A propagation path and a principle of signal light of a fourth wavelength reflected on a second reflective surface are the same as those of the signal light of the third wavelength, and details are not described herein again.

With reference to FIG. 3 and FIG. 7, the integrated optical transceiver apparatus further includes two TIAs 22. One TIA 22 is connected to the first optical detector 21a, and the other TIA 22 is connected to the second optical detector 21b. The TIA 22 is also located on the top surface 10a of the PLC structure 10. For example, the TIA 22 is mounted on the top surface 10a of the PLC structure 10 in an inverted manner.

Figure 9:
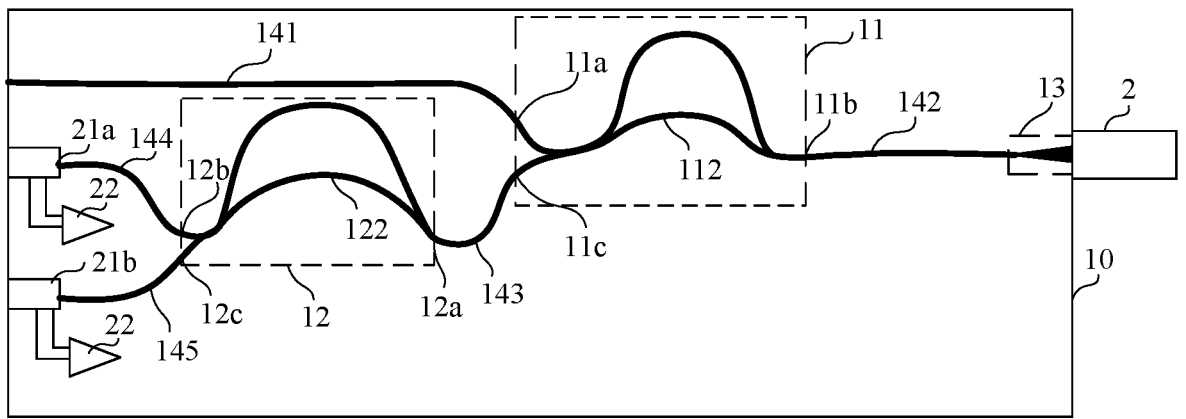
FIG. 9 is a schematic diagram of a structure of another integrated optical transceiver apparatus, according to an embodiment of this disclosure.

FIG. 9 is a top-view schematic diagram of a structure (e.g., system) of another integrated optical transceiver apparatus according to an embodiment of this disclosure. As shown in FIG. 9, a difference between the integrated optical transceiver apparatus shown in FIG. 3 lies in that, in the integrated optical transceiver apparatus shown in FIG. 9, an MZI 112 is used as a first splitter 11, an MZI 122 is used as a second splitter 12, and a tapered waveguide (namely, a waveguide SSC) is used as an SSC 13.

Figure 10:
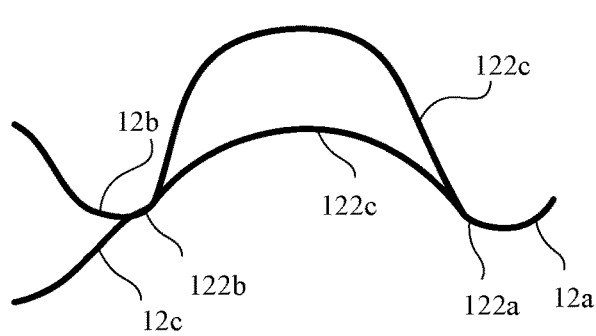
FIG. 10 is a schematic diagram of a structure of a Mach-Zehnder interferometer (MZI)

FIG. 10 is a schematic diagram of a structure of an MZI. As shown in FIG. 10, the MZI 122 includes a first coupler 122a, a second coupler 122b, and two arms 122c connected between the first coupler 122a and the second coupler 122b. The lengths of the two arms 122c are unequal. The first end 12a of the second splitter 12 is connected to the first coupler 122a, and the signal light of the third wavelength and the signal light of the fourth wavelength that are received from the first end 12a of the second splitter 12 are evenly distributed to the two arms 122c through the first coupler 122a. Because the lengths of the two arms 122c are not equal, a phase difference is generated when the signal light transmitted by the two arms 122c arrives at the second coupler 122b.

Both the second end 12b and the third end 12c of the second splitter 12 are connected to the second coupler 122b. At the second end 12b of the second splitter 12, the signal light of the third wavelength meets a constructive interference condition, the optical signal light of the fourth wavelength meets a destructive interference condition, and the second end 12b of the second splitter 12 outputs the signal light of the third wavelength. However, at the third end 12c of the second splitter 12, the signal light of the fourth wavelength meets the constructive interference condition, the optical signal light of the third wavelength meets the destructive interference condition, and the third end 12c of the second splitter 12 outputs the signal light of the fourth wavelength.

However, for the MZI 112 used as the first splitter 11, a structure and a principle are the same as those of the MZI 122, and a difference lies in that parameters such as lengths and a spacing of the two arms are different, so that the MZI 112 can output, from the second end 11b of the first splitter 11, a signal light that is in a first band and that is input from the first end 11a of the first splitter 11 to the MZI 112, and output, from the third end 11c of the first splitter 11, a signal light that is in a second band and that is input from the second end 11b of the first splitter 11 to the MZI 112. In this way, a bidirectional demultiplexing function is implemented by using the MZI 112.

Herein, both the first band and the second band include continuous wavelength ranges, the first band includes an L band and an S band, the second band is an O band, and there is no intersection between a first bandwidth and a second bandwidth.

In the integrated optical transceiver apparatus shown in FIG. 9, the second end 12b of the second splitter 12 is coupled to an optical fiber 2 by using a tapered waveguide. A small end of the tapered waveguide is connected to a second waveguide 142, and a large end of the tapered waveguide is coupled to an end surface of the optical fiber 2. The SSC formed by the tapered waveguide has a simple structure and is easy to manufacture.

Figure 11:
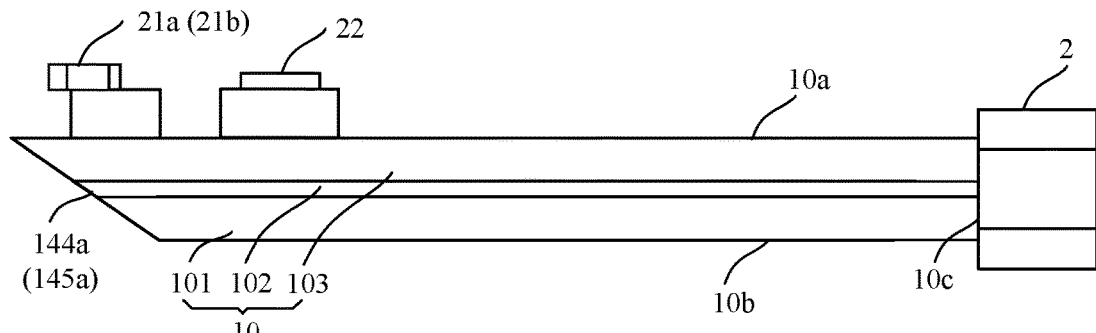
FIG. 11 is a schematic diagram of a side view of a structure of the integrated optical transceiver apparatus shown in FIG. 9.

FIG. 11 is a schematic diagram of a side view of a structure of the integrated optical transceiver apparatus shown in FIG. 9. In the structure shown in FIG. 11, similar to the integrated optical transceiver apparatus shown in FIG. 3 and FIG. 7, an end surface that is of a waveguide connected to the second end 12b of the second splitter 12 and that is positioned away from the second end 12b of the second splitter 12 is a first reflective surface 144a, and an end surface that is of a waveguide connected to the third end 12c of the second splitter 12 and that is positioned away from the third end 12c of the second splitter 12 is a second reflective surface 145a.

Figure 12:
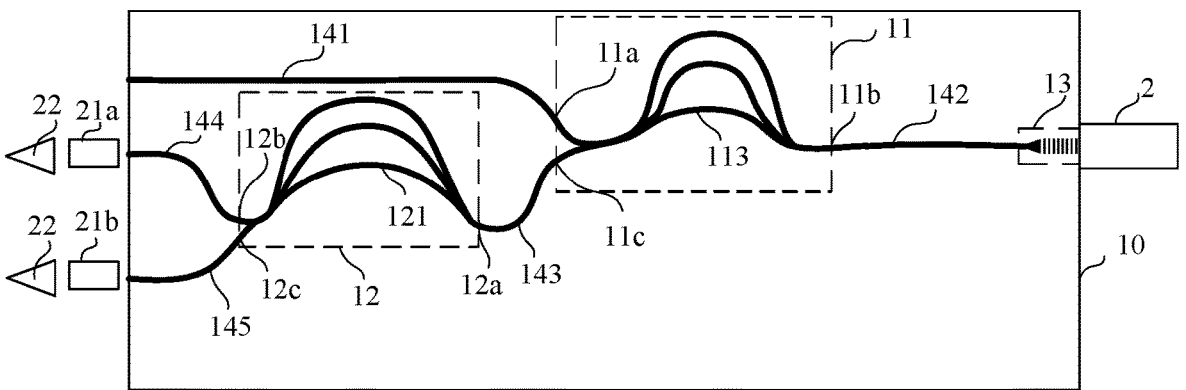
FIG. 12 is a schematic diagram of a structure of still another integrated optical transceiver apparatus according to an embodiment of this disclosure.

FIG. 12 is a schematic diagram of a top view of a structure (e.g., system) of another integrated optical transceiver apparatus according to an embodiment of this disclosure. As shown in FIG. 12, a difference between the integrated optical transceiver apparatus shown in FIG. 3 lies in that, in the integrated optical transceiver apparatus shown in FIG. 12, an AWG 113 is used as a first splitter 11.

When the AWG 113 is used as the first splitter, a structure (e.g., system) and a principle of the AWG 113 are similar to those of the AWG 121 shown in FIG. 5. Parameters such as lengths and a spacing of waveguides in an arrayed waveguide are designed, so that after being input into the AWG 113 from a first end 11a of the first splitter 11, a signal light in a first band passes through a first planar waveguide and the arrayed waveguide, and is output, based on an interference principle of light, from a second end 11b of the first splitter 11 connected to a second planar waveguide. After being input into the AWG 113 from the second end 11b of the first splitter 11, a signal light in a second band passes through a second planar waveguide and the arrayed waveguide, and is output, based on the interference principle of light, from a third end 11c of the first splitter 11. This arrangement allows for the implementation of a bidirectional demultiplexing function by using the AWG 113.

Herein, both the first band and the second band belong to continuous wavelength ranges, the first band includes an L band and an S band, the second band is an O band, and there is no intersection between a first bandwidth and a second bandwidth.

Figure 13:
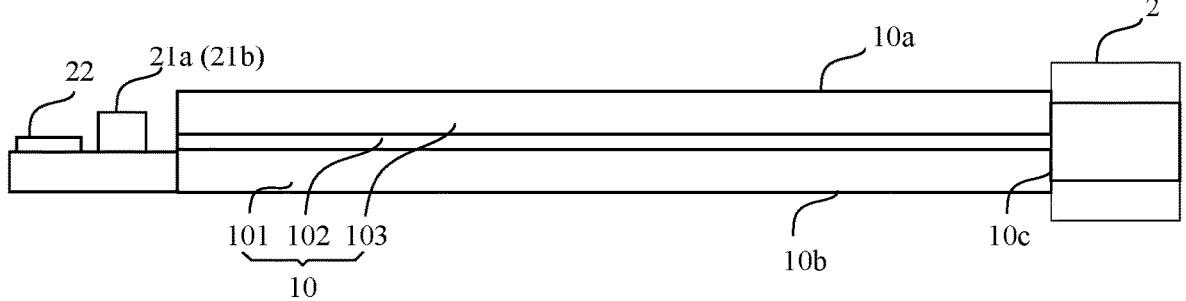
FIG. 13 is a schematic diagram of a side view of a structure of the integrated optical transceiver apparatus shown in FIG. 12.

FIG. 13 is a schematic diagram of a side view of a structure (e.g., design) of the integrated optical transceiver apparatus shown in FIG. 12. As shown in FIG. 13, an electrical device is located on a side surface 10c of a PLC structure 10. For example, a first optical detector 21a, a second optical detector 21b, and a TIA 22 are fastened on a same substrate, and the first optical detector 21a and the second optical detector 21b are attached to the side surface 10c of the PLC structure 10 by using a substrate, so as to integrate the electrical device and the PLC structure 10.

For example, the PLC structure 10 is a cuboid, and an optical fiber 2 and the electrical device are respectively located on two opposite side surfaces 10c of the cuboid. One end of a fourth waveguide 144 and one end of a fifth waveguide 145 are located on the side surface 10c, a light of a third wavelength is directly emitted from an end surface of the fourth waveguide 144 to the first optical detector 21a, and a light of a fourth wavelength is directly emitted from an end surface of the fifth waveguide 145 to the second optical detector 21b.

Alternatively, in another embodiment, the optical fiber 2 and the electrical device are located on two adjacent side surfaces of the cuboid, or the optical fiber 2 and the electrical device are located on a same side surface of the cuboid.

In some examples, a signal light of a first wavelength and a signal light of a second wavelength are provided by a light source outside the integrated optical transceiver apparatus. In other examples, the signal light of the first wavelength and the signal light of the second wavelength are provided by a light source inside the integrated optical transceiver apparatus. In this case, the integrated optical transceiver apparatus provided in some embodiments further includes a light source. The light source is configured to provide the signal light of the first wavelength and the signal light of the second wavelength. The light source is disposed on the PLC structure.

Optionally, the light source includes a first laser, a second laser, and an optical multiplexer. The first laser is configured to transmit the signal light of the first wavelength, the second laser is configured to transmit the signal light of the second wavelength, and the optical multiplexer is configured to combine the signal light of the first wavelength and the signal light of the second wavelength into one signal and output the signal to the first end of the first splitter.

Optionally, the light source is adhered to the side surface 10c of the PLC structure 10, so as to be integrated on the PLC structure 10.

For example, the first laser and the second laser are semiconductor lasers. The optical multiplexer includes but is not limited to a PLC-type optical multiplexer, provided that the signal light transmitted by the first laser and the second laser can be combined into one signal and provided to the first end of the first splitter.

It should be noted that, in some examples, the integrated optical transceiver apparatus provided in some embodiments is further configured to send and receive a signal light of a plurality of wavelengths. For example, the first splitter is further configured to output, from the second end of the first splitter, the signal light of the fifth wavelength that is received from the first end of the first splitter to the optical fiber, and output, from a third end of the first splitter, the signal light of the fifth wavelength that is from the optical fiber and that is received from the second end of the first splitter together with the signal light of the first wavelength and the signal light of the second wavelength. The second splitter is further configured to separate the signal light of the fifth wavelength that is output from the third end of the first splitter from the signal light of the third wavelength and the fourth wavelength, and output the signal light of the fifth wavelength from a fourth end of the splitter. The electrical device further includes a third optical detector located on the PLC structure. The third optical detector receives the signal light of the fifth wavelength that is output from the fourth end of the splitter, and converts the received signal light of the fifth wavelength into an electrical signal.

In this case, the second splitter is implemented through an AWG, or is implemented through two cascaded MZIs.

An embodiment of this disclosure further provides an optical line terminal (OLT). The OLT includes a plurality of optical modules, and any optical module includes the foregoing integrated optical transceiver apparatus. For example, the plurality of optical modules are inserted into a same card.

Figure 14:
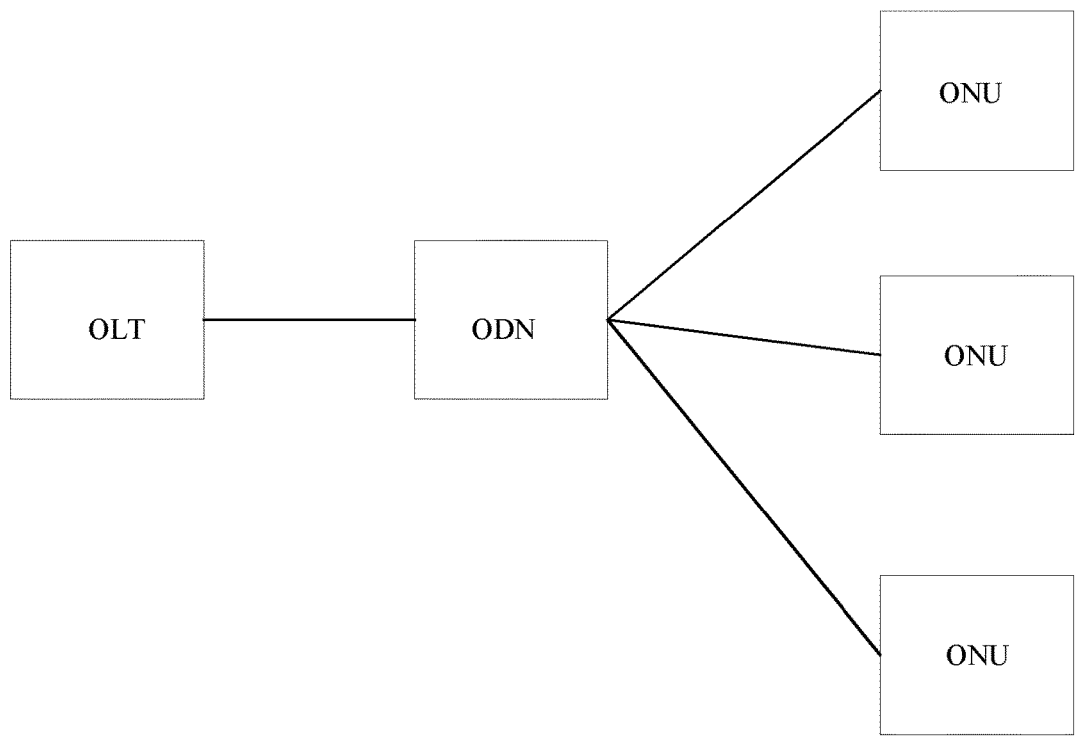
FIG. 14 is a schematic diagram of a structure of a passive optical network (PON) system according to an embodiment of this disclosure.

An embodiment of this disclosure further provides a passive optical network (PON) system. FIG. 14 is a schematic diagram of a structure of a PON system according to an embodiment of this disclosure. As shown in FIG. 14, the PON system includes an OLT, an optical distribution network (ODN), and optical network units (ONUs). The OLT is connected to a plurality of ONUs through the ODN.

For an upper-layer network, the OLT is configured to implement uplink access of the PON network. For the ONUs, the OLT is configured to implement functions such as control, management, and ranging. The signal light of the first wavelength and the signal light of the second wavelength are downstream signal light, namely, signal light sent by the OLT to the ONUs, and the signal light of the third wavelength and the signal light of the fourth wavelength are upstream signal light, namely, signal light sent by the ONUs to the OLT.

Unless otherwise defined, the technical terms or scientific terms used herein should have general meanings understood by a person of ordinary skill in the art of this disclosure. The words "first", "second", "third", and the like used in the specification and claims of this patent application do not indicate any order, quantity, or significance, but are merely used to distinguish between different components. Likewise, "a/an", "one", or the like is not intended to indicate a quantity limitation either, but is intended to indicate existing at least one. "Include", "contain", or the like indicates that the elements or objects before "include" or "include" cover the elements or objects listed after "include" or "contain" and their equivalents, and other elements or objects are not excluded. "Connection", "link" or the like is not limited to a physical or mechanical connection, but may include an electrical connection, whether directly or indirectly. "Up", "down", "left", "right", "top", "bottom", and the like are only used to indicate a relative location relationship, and when an absolute location of a described object changes, the relative location relationship may also change accordingly.

The foregoing descriptions are merely embodiments of this disclosure, but are not intended to limit this disclosure. Any modification, equivalent replacement, or improvement made without departing from the principle of this disclosure should fall within the protection scope of this disclosure.

What is claimed is:

1. An integrated optical transceiver apparatus comprising:
a planar lightwave circuit structure, wherein:
    an optical device is integrated in the planar lightwave circuit structure, and the optical device comprises a first splitter and a second splitter;
    the first splitter has a first end, a second end, and a third end, and the first splitter is configured to output, from the second end of the first splitter to an optical fiber, a signal light of a first wavelength and a signal light of a second wavelength that are received by the first end of the first splitter, and output, from the third end of the first splitter, a signal light of a third wavelength and a signal light of a fourth wavelength that are received by the second end of the first splitter from the optical fiber; and
    the second splitter has a first end, a second end, and a third end, the first end of the second splitter is connected to the third end of the first splitter, and the second splitter is configured to separate the signal light of the third wavelength and the signal light of the fourth wavelength that are output from the third end of the first splitter, and output the signal light of the third wavelength from the second end of the second splitter and output the signal light of the fourth wavelength from the third end of the second splitter; and
an electrical device located on the planar lightwave circuit structure, the electrical device comprising a first optical detector and a second optical detector, the first optical detector is configured to convert, into an electrical signal, the signal light of the third wavelength that is output by the second end of the second splitter, and the second optical detector is configured to convert, into an electrical signal, the signal light of the fourth wavelength that is output by the third end of the second splitter, wherein
the planar lightwave circuit structure has a top surface and a side surface, the side surface surrounds the top surface, the first optical detector and the second optical detector are located on the side surface or the top surface, and an end surface of the optical fiber is disposed opposite to the side surface.

2. The integrated optical transceiver apparatus according to claim 1, wherein the optical device further comprises a spotsize converter, wherein the spotsize converter is connected to the second end of the first splitter, and the spotsize converter is configured to:

couple, to the optical fiber, the signal light of the first wavelength and the signal light of the second wavelength that are output by the second end of the first splitter, and couple, to the second end of the first splitter, the signal light of the third wavelength and the signal light of the fourth wavelength that are output by the optical fiber.

3. The integrated optical transceiver apparatus according to claim 2, wherein the spotsize converter is one of the following:

a grating waveguide spotsize converter, wherein the grating waveguide spotsize converter comprises a tapered waveguide and a grating array, the tapered waveguide and the grating array are sequentially disposed in a direction away from the second end of the first splitter, the tapered waveguide is configured to perform a spotsize conversion in a first direction, and the grating array is configured to perform a spotsize conversion in a second direction, to couple, to the optical fiber, the signal light of the first wavelength and the signal light of the second wavelength that are output by the second end of the first splitter, and couple, to the second end of the first splitter, the signal light of the third wavelength and the signal light of the fourth wavelength that are output by the optical fiber, wherein the first direction is perpendicular to the second direction; or a waveguide spotsize converter, wherein the waveguide spotsize converter is a tapered waveguide, an input end of the tapered waveguide is coupled to the second end of the first splitter, and an output end of the tapered waveguide is coupled to the optical fiber, to couple, to the optical fiber, the signal light of the first wavelength and the signal light of the second wavelength that are output by the second end of the first splitter, and couple, to the second end of the first splitter, the signal light of the third wavelength and the signal light of the fourth wavelength that are output by the optical fiber.

4. The integrated optical transceiver apparatus according to claim 1, wherein the planar lightwave circuit structure further comprises a first reflective surface and a second reflective surface, wherein the first reflective surface is configured to reflect, to the first optical detector, the signal light of the third wavelength that is output by the second end of the second splitter, and the second reflective surface is configured to reflect, to the second optical detector, the signal light of the fourth wavelength that is output by the third end of the second splitter.

5. The integrated optical transceiver apparatus according to claim 1, wherein the planar lightwave circuit structure comprises a first silicon dioxide layer, a second silicon dioxide layer, and a third silicon dioxide layer that are sequentially stacked, wherein a refractive index of the second silicon dioxide layer is greater than a refractive index of the first silicon dioxide layer, the refractive index of the second silicon dioxide layer is greater than a refractive index of the third silicon dioxide layer, and the optical device is integrated into the second silicon dioxide layer.

6. The integrated optical transceiver apparatus according to claim 1, wherein the electrical device further comprises two transimpedance amplifiers, one of the two transimpedance amplifiers is connected to the first optical detector, and the other of the two transimpedance amplifiers is connected to the second optical detector.

7. The integrated optical transceiver apparatus according to claim 1, wherein the first splitter is a directional coupler, a Mach-Zehnder interferometer, or an arrayed waveguide grating.

8. The integrated optical transceiver apparatus according to claim 1, wherein the second splitter is a Mach-Zehnder interferometer or an arrayed waveguide grating.

9. The integrated optical transceiver apparatus according to claim 1, wherein both the first optical detector and the second optical detector are avalanche photodiodes or positive-intrinsic-negative (PIN) photodiodes.

10. The integrated optical transceiver apparatus according to claim 1, wherein the integrated optical transceiver apparatus further comprises a light source, the light source is configured to provide the signal light of the first wavelength and the signal light of the second wavelength, and the light source is located on the planar lightwave circuit structure.

11. The integrated optical transceiver apparatus according to claim 10, wherein the light source comprises a first laser, a second laser, and an optical multiplexer, wherein the first laser is configured to transmit the signal light of the first wavelength, the second laser is configured to transmit the signal light of the second wavelength, and the optical multiplexer is configured to combine the signal light of the first wavelength and the signal light of the second wavelength into one signal and output the signal to the first end of the first splitter.

12. The integrated optical transceiver apparatus according to claim 1, wherein the first wavelength is within a long-wavelength band, the second wavelength is within a short-wavelength band, and the third wavelength and the fourth wavelength are within an original band.

13. An optical line terminal comprising a plurality of optical modules, wherein any one of the plurality of optical modules comprises an integrated optical transceiver apparatus, wherein the integrated optical transceiver apparatus comprises:

a planar lightwave circuit structure, wherein:

an optical device is integrated in the planar lightwave circuit structure, and the optical device comprises a first splitter and a second splitter;

the first splitter has a first end, a second end, and a third end, and the first splitter is configured to output, from the second end of the first splitter to an optical fiber, a signal light of a first wavelength and a signal light of a second wavelength that are received by the first end of the first splitter, and output, from the third end of the first splitter, a signal light of a third wavelength and a signal light of a fourth wavelength that are received by the second end of the first splitter from the optical fiber; and the second splitter has a first end, a second end, and a third end, the first end of the second splitter is connected to the third end of the first splitter, and the second splitter is configured to separate the signal light of the third wavelength and the signal light of the fourth wavelength that are output from the third end of the first splitter, and output the signal light of the third wavelength from the second end of the second splitter and output the signal light of the fourth wavelength from the third end of the second splitter; and an electrical device located on the planar lightwave circuit structure, the electrical device comprises a first optical detector and a second optical detector, the first optical detector is configured to convert, into an electrical signal, the signal light of the third wavelength that is output by the second end of the second splitter, and the second optical detector is configured to convert, into an electrical signal, the signal light of the fourth wavelength that is output by the third end of the second splitter, wherein the planar lightwave circuit structure has a top surface and a side surface, the side surface surrounds the top surface, the first optical detector and the second optical detector are located on the side surface or the top surface, and an end surface of the optical fiber is disposed opposite to the side surface.

14. The optical line terminal according to claim 13, wherein the optical device further comprises a spotsize converter, wherein the spotsize converter is connected to the second end of the first splitter, and the spotsize converter is configured to:

couple, to the optical fiber, the signal light of the first wavelength and the signal light of the second wavelength that are output by the second end of the first splitter, and couple, to the second end of the first splitter, the signal light of the third wavelength and the signal light of the fourth wavelength that are output by the optical fiber.

15. The optical line terminal according to claim 14, wherein the spotsize converter is one of the following:

a grating waveguide spotsize converter, wherein the grating waveguide spotsize converter comprises a tapered waveguide and a grating array, the tapered waveguide and the grating array are sequentially disposed in a direction away from the second end of the first splitter, the tapered waveguide is configured to perform a spotsize conversion in a first direction, and the grating array is configured to perform a spotsize conversion in a second direction, to couple, to the optical fiber, the signal light of the first wavelength and the signal light of the second wavelength that are output by the second end of the first splitter, and couple, to the second end of the first splitter, the signal light of the third wavelength and the signal light of the fourth wavelength that are output by the optical fiber, wherein the first direction is perpendicular to the second direction; or a waveguide spotsize converter, wherein the waveguide spotsize converter is a tapered waveguide, an input end of the tapered waveguide is coupled to the second end of the first splitter, and an output end of the tapered waveguide is coupled to the optical fiber, to couple, to the optical fiber, the signal light of the first wavelength and the signal light of the second wavelength that are output by the second end of the first splitter, and couple, to the second end of the first splitter, the signal light of the third wavelength and the signal light of the fourth wavelength that are output by the optical fiber.

16. The optical line terminal according to claim 13, wherein the planar lightwave circuit structure further comprises a first reflective surface and a second reflective surface, wherein the first reflective surface is configured to reflect, to the first optical detector, the signal light of the third wavelength that is output by the second end of the second splitter, and the second reflective surface is configured to reflect, to the second optical detector, the signal light of the fourth wavelength that is output by the third end of the second splitter.

17. The optical line terminal according to claim 13, wherein the planar lightwave circuit structure comprises a first silicon dioxide layer, a second silicon dioxide layer, and a third silicon dioxide layer that are sequentially stacked, wherein a refractive index of the second silicon dioxide layer is greater than a refractive index of the first silicon dioxide layer, the refractive index of the second silicon dioxide layer is greater than a refractive index of the third silicon dioxide layer, and the optical device is integrated into the second silicon dioxide layer.

18. The optical line terminal according to claim 13, wherein the electrical device further comprises two transimpedance amplifiers, one of the two transimpedance amplifiers is connected to the first optical detector, and the other of the two transimpedance amplifiers is connected to the second optical detector.

* * * * *